(No Model.)  2 Sheets—Sheet 1.
J. M. HARVEY.
COMBINED ANIMAL TRAP AND CHICKEN COOP.

No. 556,266. Patented Mar. 10, 1896.

WITNESSES:
John A. Rennie
Isaac B. Owens

INVENTOR
J. M. Harvey
BY
Munn & Co
ATTORNEYS.

(No Model.) 2 Sheets—Sheet 2.
J. M. HARVEY.
COMBINED ANIMAL TRAP AND CHICKEN COOP.

No. 556,266. Patented Mar. 10, 1896.

WITNESSES:
John A Rennie
Isaac Blevens

INVENTOR
J. M. Harvey
BY Munn & Co.
ATTORNEYS.

UNITED STATES PATENT OFFICE.

JAMES MADISON HARVEY, OF PALMYRA, ASSIGNOR OF TWO-THIRDS TO JOHN H. MARABLE, SR., AND WILLIAM M. McCAULEY, OF CLARKSVILLE, TENNESSEE.

COMBINED ANIMAL-TRAP AND CHICKEN-COOP.

SPECIFICATION forming part of Letters Patent No. 556,266, dated March 10, 1896.

Application filed August 10, 1895. Serial No. 558,885. (No model.)

*To all whom it may concern:*

Be it known that I, JAMES MADISON HARVEY, of Palmyra, in the county of Montgomery and State of Tennessee, have invented a new and Improved Coop for Raising Fowls, of which the following is a full, clear, and exact description.

The main object of the invention is to provide a structure which will combine an improved coop for chickens and also a trap by which animals seeking to prey on the chickens may be caught and retained.

The invention also contemplates various improvements in the construction of the device, whereby both the trap and coop departments are made more effective and desirable, and whereby, further, the trap may be used as a part of the coop.

To these ends the invention consists mainly in a structure having two compartments and each having various peculiarities of construction and combinations of parts, whereby one is capable of containing the chickens and of serving as a roost and living-place therefor, and whereby the other is made capable of catching animals, such as rats, and also serving as a feeding-compartment for the chickens.

Reference is to be had to the accompanying drawings, forming a part of this specification, in which similar characters of reference indicate corresponding parts in all the figures.

Figure 1:
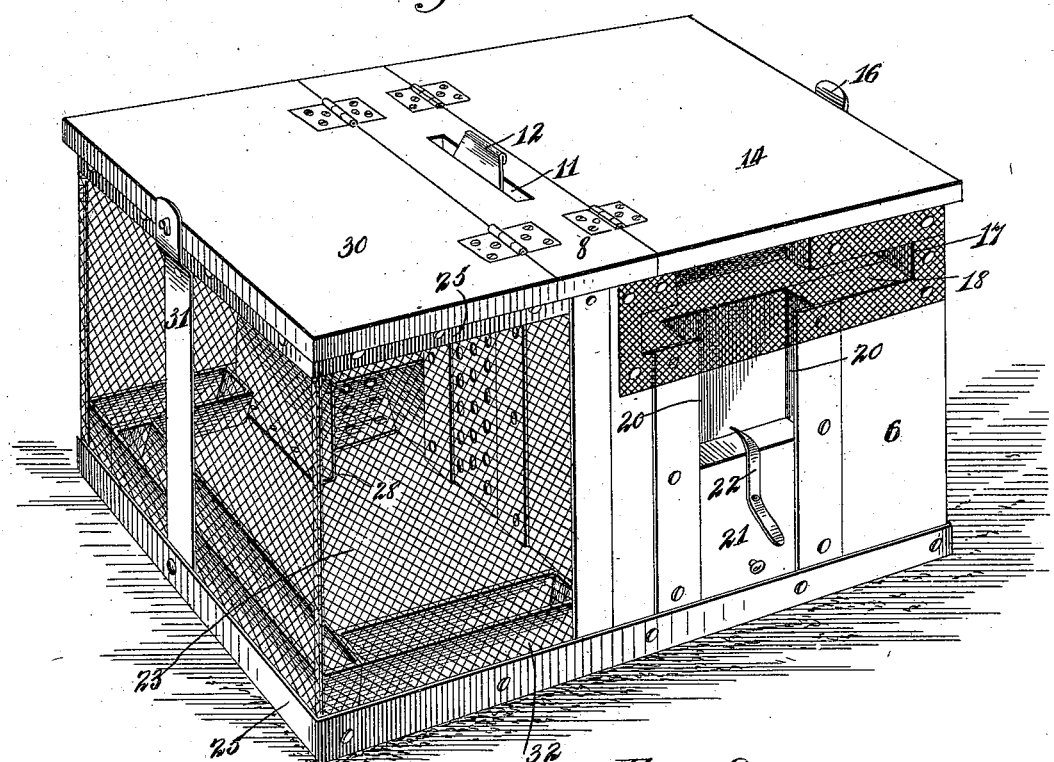
Figure 2:
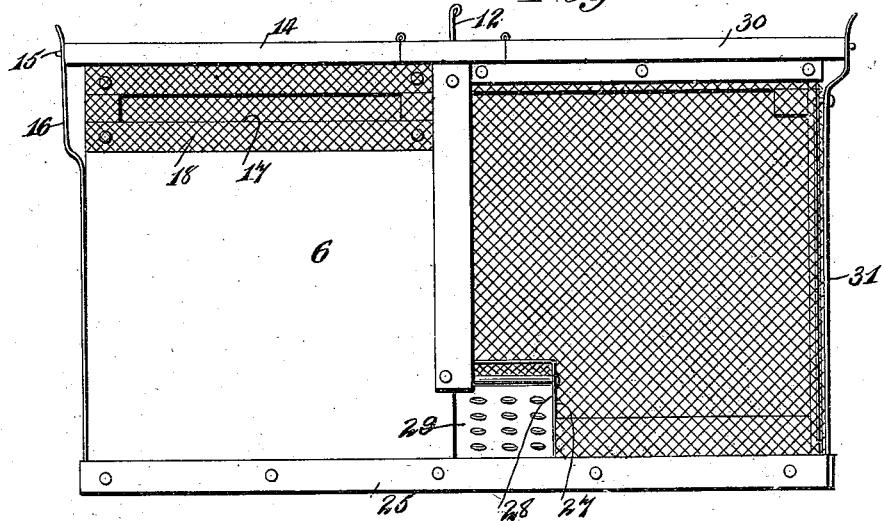
Figure 3:
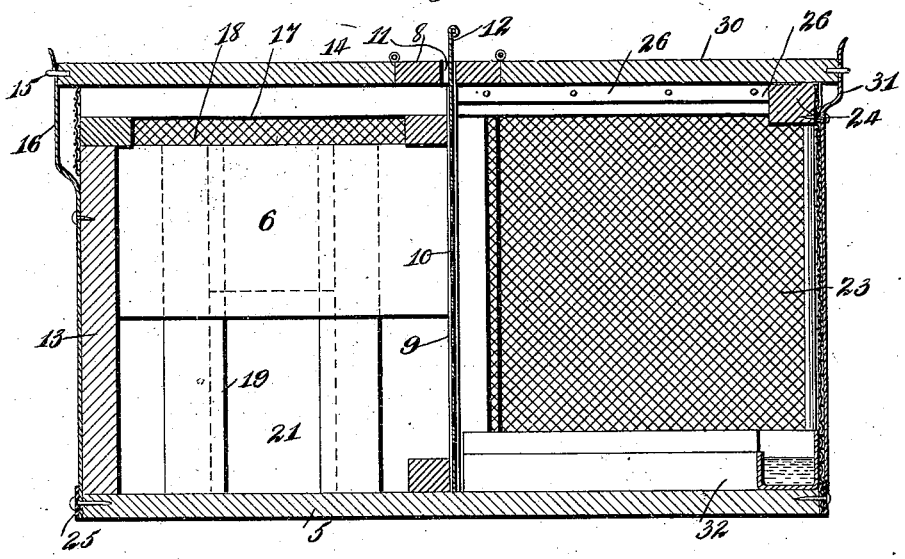
Figure 4:
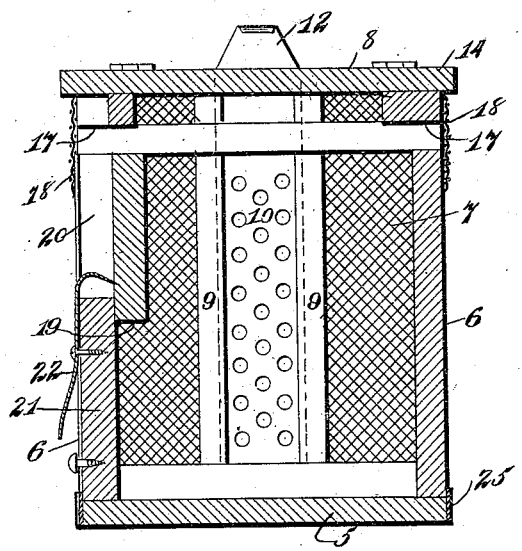

Figure 1 is a perspective view of a chicken-coop constructed after the manner of my invention. Fig. 2 is a side elevation thereof. Fig. 3 is a vertical longitudinal section, and Fig. 4 is a cross-section.

In carrying out my invention I provide a bottom 5, the same being constructed of any suitable material and having the sides 6 secured thereto along one-half of its length, said sides being let into the edges of the bottom 5, so that the outer parts of the sides will be aligned with the remaining edges of the bottom 5. Mounted at the inner ends of the sides 6 is a transverse screen-partition 7, which extends across from one side to the other, and which has the rigid top section 8 held rigidly at its upper edge, the top section 8 being also secured to the sides 6.

Formed in the partition 7 and extending vertically throughout its height is an opening having the guides 9 at its respective sides, and in these guides a gate 10 is vertically movable, the same being projected through an opening 11 in the top section 8 and provided with an operating extension 12, whereby it may be manipulated. The gate 10 is perforated, as shown, and is of such a size and arrangement that small chickens may be permitted to pass through the opening in the partition 7 upon the raising of the gate. The outer edges of the sides 6 have secured thereto the back 13, and this completes the inclosure of the roosting or coop department.

Hinged to the rigid top section 8 is a door 14, which is provided with a pin 15 at its free end, the same engaging with a spring-catch 16, and by these means the door is held closed. The door 14 projects beyond the sides 6 and back 13, so as to make it possible to more readily grasp and raise it.

Formed in the sides 6 and in the back 13 are ventilation-openings 17, which are covered with wire-screen or other reticulated material, and by which means the coop-department of the device is abundantly supplied with air. Formed in one of the sides 6 is an opening 19 which has directly outside of it the vertical guideway 20, in which a door 21 is vertically movable, and this door is capable of dropping, as shown in Fig. 1, so as to close the opening 19, and of being elevated in the guideway 20, so as to open the same.

Pivoted on the door 21 is a spring-lever 22, which has its upper end pointed and projected inwardly past the upper edge of the door 21, so as to be in position to engage with the adjacent side 6 and to be embedded therein. By means of this lever 22 the door 21 may be held at any desired elevation, and the lever may be released from engagement with the sides 6 by depressing its lower end, the tendency of the lever being such that its point will normally engage the wall or side 6.

The trap-department of the device comprises screen sides 23, which are secured to the edges of the bottom 5 and to the rectangular framework 24 by means of binding-strips 25, the same being extended around the outer edges of the respective parts and serving the double function of strengthening the whole structure and of holding the screens in place. The inner sides of the frame 24 are provided with metal bindings 26, which extend around their inner sides and which serve the double function of strengthening the parts and of preventing animals entrapped from gnawing away the woodwork.

Formed in one side of the screen 23 is an opening 27, in which an angle-plate 28 is secured, the said plate being arranged with one edge held to the partition 7 so as to form a rectangular or square opening in the screen. This angle-plate is extended into the trap-compartment and has pivotally mounted at its outer portion a gate 29, the same being preferably perforated and arranged to open inwardly so that animals may enter the trap section or compartment by lifting the gate, but so that they will not be capable of returning because of the described disposition which the gate has.

Hinged on the rigid top section 8 is a door 30 which rests upon the frame 24 and which is provided with a projecting stud at its free end, the same being arranged to co-operate with the spring-catch 31 and hold the gate closed. This gate is also extended beyond the edges of the framework 24, so that the gate may be more readily grasped.

Located within the trap-section are the feed and water troughs 32, the same being of any construction and being placed there so that the chickens may be fed and watered in the trap-section when so desired, thereby converting the trap-section into a feed-section, as has been before explained.

From the foregoing description the use and operation of my invention will be well understood, and it will be seen that chickens may be placed within the coop-section and made to live and roost there, and that they may be admitted into the trap-section for feeding purposes and for exercise. It will also be understood that animals endeavoring to prey upon the chickens will enter the trap-section and be imprisoned therein. Still further, the device may be made of various dimensions so that it will be adapted for small chicks or for grown fowls.

Having thus described my invention, I claim as new and desire to secure by Letters Patent—

1. A combined animal-trap and chicken-coop, the same having two compartments, a door between the compartments, a door commanding an opening in the outer wall of one compartment, and a trap-door commanding an opening in the outer wall of the remaining compartment, substantially as described.

2. A combined animal-trap and chicken-coop, comprising two compartments, a door commanding an opening between the two compartments, a second door commanding an opening in the outer wall of one compartment, a trap-door for the remaining compartment, two hinged lids respectively forming the covers of the two compartments, and retaining devices for said lids, substantially as described.

3. A combined animal-trap and chicken-coop, the same having a partition, a top section above the partition and formed with an opening, a sliding door commanding an opening in the partition and having a part projecting through the opening in the top section, a door commanding an opening in the outer wall of the one compartment, a trap-door commanding an opening in the remaining compartment hinged lids respectively forming the tops of the compartments, and fastening devices for the lids, substantially as described.

4. A combined animal-trap and chicken-coop having a partition forming two compartments, a top section above the partition and having an opening therein, a vertically-movable door in the partition, said door having a part projecting through the opening of the top section, hinged lids respectively forming the roofs of the two compartments, fastening devices for the lids, a sliding door commanding an opening in one compartment, a spring fastening device carried by said door and having a point engaging the frame of the device to lock the door, and a trap-door commanding an opening in the remaining compartment, substantially as described.

JAMES MADISON HARVEY.

Witnesses:
WM. SHEPHERD,
A. F. TILLEY.